US011216966B2

(12) United States Patent
Johnson et al.

(10) Patent No.: US 11,216,966 B2
(45) Date of Patent: Jan. 4, 2022

(54) SYSTEMS AND METHODS FOR AUTOMATED PRODUCT MEASUREMENT

(71) Applicant: Advanced Solutions Innovation Labs, LLC, Louisville, KY (US)

(72) Inventors: Jeremy Johnson, Waynesville, OH (US); Rob Eli, Tucson, AZ (US); Alex Schultz, Fort Wayne, IN (US)

(73) Assignee: Advanced Solutions Innovation Labs, LLC, Louisville, KY (US)

(*) Notice: Subject to any disclaimer, the term of this patent is extended or adjusted under 35 U.S.C. 154(b) by 0 days.

(21) Appl. No.: 16/824,768

(22) Filed: Mar. 20, 2020

(65) Prior Publication Data

US 2020/0302631 A1 Sep. 24, 2020

Related U.S. Application Data

(60) Provisional application No. 62/822,334, filed on Mar. 22, 2019, provisional application No. 62/887,742, filed on Aug. 16, 2019.

(51) Int. Cl.
| | |
|---|---|
| *G06T 7/62* | (2017.01) |
| *G06K 7/10* | (2006.01) |
| *G06T 7/521* | (2017.01) |
| *H04M 1/02* | (2006.01) |
| *H04M 1/72409* | (2021.01) |

(52) U.S. Cl.
CPC ............ *G06T 7/62* (2017.01); *G06K 7/10881* (2013.01); *G06T 7/521* (2017.01); *H04M 1/0254* (2013.01); *H04M 1/72409* (2021.01)

(58) Field of Classification Search
CPC . G06T 7/62; G06T 7/521; G06T 2207/10028; G06T 7/60; H04M 1/72409; H04M 1/0254; H04M 1/72403; H04M 2250/52; G06K 7/10881
See application file for complete search history.

(56) References Cited

U.S. PATENT DOCUMENTS

| | | | |
|---|---|---|---|
| 6,160,249 A | 12/2000 | Webb et al. | |
| 6,639,684 B1 * | 10/2003 | Knighton | G01B 11/2518 356/601 |
| 7,580,117 B2 * | 8/2009 | Okada | G01S 7/4812 356/4.01 |

(Continued)

OTHER PUBLICATIONS

International Search Report dated Jun. 23, 2020 for corresponding PCT/US2020/023748.

*Primary Examiner* — Christopher M Brandt
(74) *Attorney, Agent, or Firm* — Dinsmore & Shohl, LLP

(57) ABSTRACT

Methods and systems including a measurement device and a smart mobile device including a camera, a processor, a memory communicatively coupled to the processor, and machine readable instructions stored in the memory that may cause a system to perform at least the following when executed by the processor: use the camera of the smart mobile device to capture an image of a remote product; apply a sizing algorithm to the image of the remote product to generate a relative product size; generate a relative distance to the remote product through the measurement device; and apply triangulation and linear regression algorithms to generate an automated actual product measurement of the remote product based on the relative product size and the relative distance.

19 Claims, 12 Drawing Sheets

(56) References Cited

U.S. PATENT DOCUMENTS

| | | | |
|---|---|---|---|
| 8,446,509 B2 | 5/2013 | Jones et al. | |
| 8,738,080 B2 * | 5/2014 | Nhiayi | H04N 5/2252 |
| | | | 455/557 |
| 9,247,041 B2 * | 1/2016 | Moran | G06K 9/209 |
| 2016/0102975 A1 * | 4/2016 | McCloskey | G01B 11/00 |
| | | | 702/97 |
| 2016/0307325 A1 * | 10/2016 | Wang | H04N 5/23245 |
| 2017/0228940 A1 * | 8/2017 | Kutliroff | G06T 7/12 |
| 2017/0301173 A1 * | 10/2017 | Hindsgaul | G07F 17/0014 |

* cited by examiner

SYSTEMS AND METHODS FOR AUTOMATED PRODUCT MEASUREMENT

CROSS-REFERENCE TO RELATED APPLICATIONS

The present disclosure claims the benefit of U.S. Provisional App. No. 62/822,334, filed Mar. 22, 2019, entitled "SYSTEMS AND METHODS FOR AUTOMATED PRODUCT MEASUREMENT," and U.S. Provisional App. No. 62/887,742, filed Aug. 16, 2019, entitled "SYSTEMS AND METHODS FOR AUTOMATED PRODUCT MEASUREMENT," the entireties of which are incorporated by reference herein.

TECHNICAL FIELD

The present disclosure relates to remote product measurement and, more particularly, to use of an application tool device system to automate measurement of a remote product.

BACKGROUND

Users in plant and other environments may physically and manually measure dimensions of a remote product. The manual measurement can performed in a variety of different fashions, including through physical measurement with devices such as ruler, tape measure, 3D scanner, or the like. A need exists for alternative and more efficient measurement tools to remotely measure object data in an environment.

BRIEF SUMMARY

According to the subject matter of the present disclosure, methods and systems for automated product measurement may include a measurement device and a smart mobile device including a camera, a processor, a memory communicatively coupled to the processor, and machine readable instructions stored in the memory that may cause a system to perform at least the following when executed by the processor: use the camera of the smart mobile device to capture an image of a remote product; apply a sizing algorithm to the image of the remote product to generate a relative product size; generate a relative distance to the remote product through the measurement device; and apply triangulation and linear regression algorithms to generate an automated actual product measurement of the remote product based on the relative product size and the relative distance.

In an embodiment, a system for automated product measurement may include a measurement device, a smart mobile device including a camera and an application tool, a processor, a memory communicatively coupled to the processor, and machine readable instructions stored in the memory. The machine readable instructions may cause the system to perform at least the following when executed by the processor: use the camera of the smart mobile device to capture an image of a remote product, apply a sizing algorithm to the image of the remote product via the application tool to generate a relative product size, generate a relative distance to the remote product through the measurement device, and apply triangulation and linear regression algorithms via the application tool to generate an automated actual product measurement of the remote product based on the relative product size and the relative distance.

In another embodiment, a method for automated product measurement may include using a camera of a smart mobile device to capture an image of a remote product, the smart mobile device including an application tool, applying a sizing algorithm to the image of the remote product via the application tool to generate a relative product size, generating a relative distance to the remote product through a measurement device, and applying triangulation and linear regression algorithms via the application tool to generate an automated actual product measurement of the remote product based on the relative product size and the relative distance.

In yet another embodiment, an application tool of a smart mobile device for automated product measurement may include a processor, a memory communicatively coupled to the processor, and machine readable instructions. The machine readable instructions may be stored in the memory to cause the application tool to perform at least the following when executed by the processor: receive an image of a remote product, apply a sizing algorithm to the image of the remote product to generate a relative product size, receive a relative distance to the remote product from a measurement device communicatively coupled to the application tool, and apply triangulation and linear regression algorithms to generate an automated actual product measurement of the remote product based on the relative product size and the relative distance.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
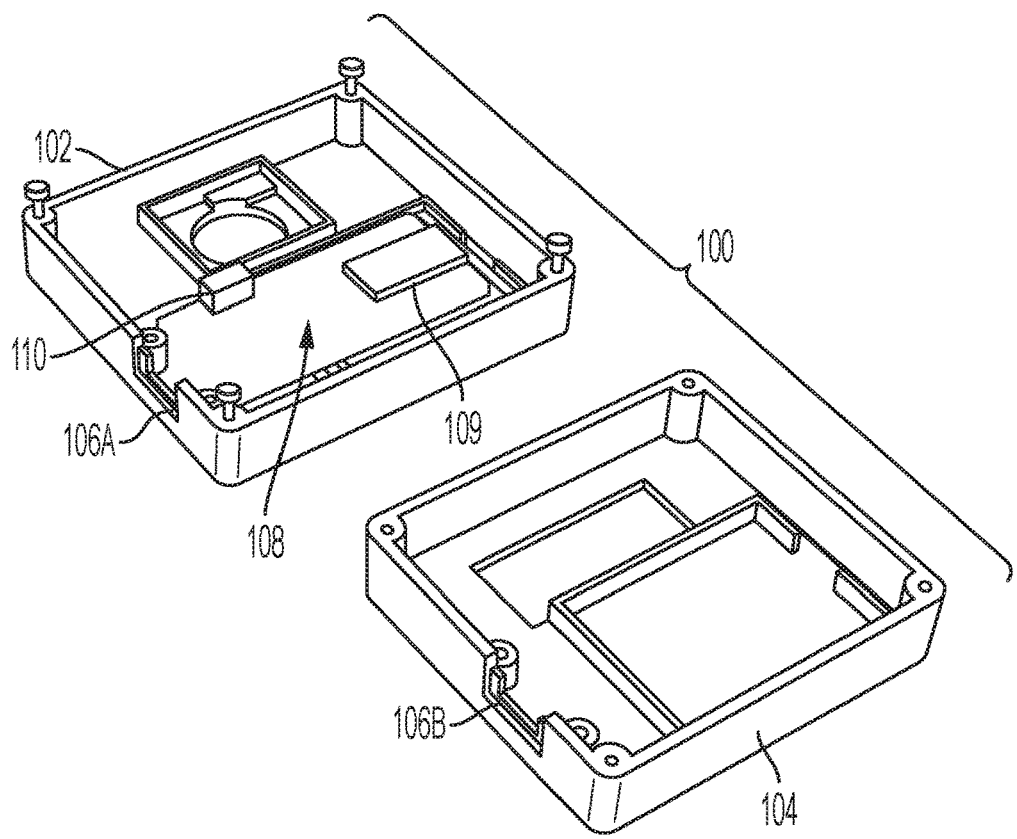
FIG. 1 illustrates an internal view of a measurement device for automated product measurement, according to one or more embodiments shown and described herein.

Referring generally to the figures, embodiments of the present disclosure are directed to systems and methods for automated product measurement utilizing mobile device tools and devices. Product dimension data has various uses within the material handling industry. The systems and methods for automated product measurement utilizing mobile device tools and devices as described herein is configured to target generation and use of dimensions for product placement (e.g., "profiling" or "slotting") in an industrial environment. Availability of the systems and methods described herein for automated product measurement may considerably decrease time and cost involved in obtaining and maintaining product dimensions through, for example, manual measurement applications.

Reference will now be made in detail to embodiments of the configuration systems, and examples of such systems are illustrated in the accompanying drawings. Wherever possible, the same reference numerals will be used throughout the drawings to refer to the same or like parts. Various embodiments of the configuration systems will be described in further detail herein with specific reference to the appended drawings.

Figure 2:
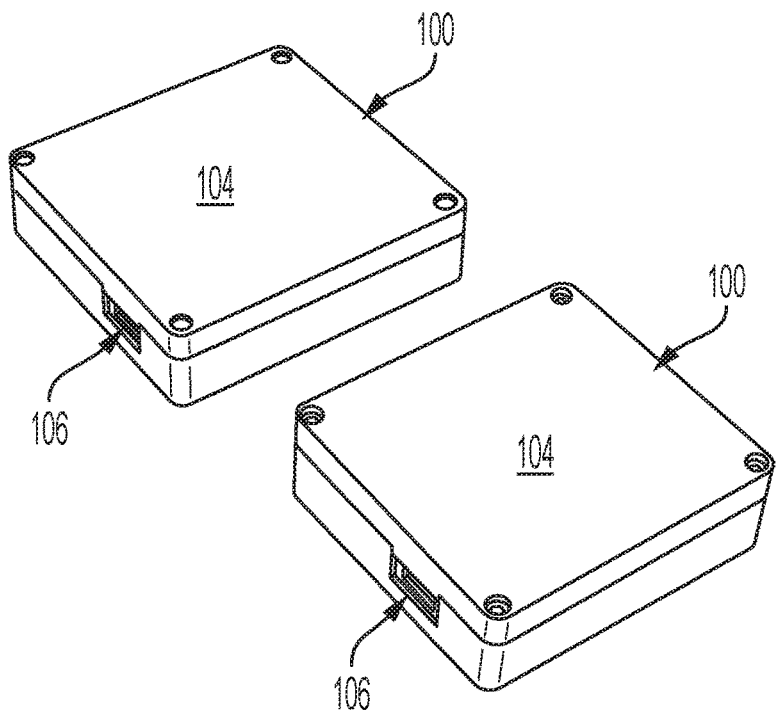
FIG. 2 illustrates an external view of measurement devices for automated product measurement, according to one or more embodiments shown and described herein.

Referring initially to FIG. 1, an internal view of a measurement device 100 for automated product measurement is shown. In an embodiment, the measurement device 100 includes a first housing 102 and a second housing 104 configured to attach to the first housing 102 to define an encased housing unit, as shown in FIG. 2. Each of the first housing 102 and the second housing 104 include sidewalls defining respective slot apertures 106A and 106B that, in the encased housing unit of FIG. 2, together define a slot aperture 106. The measurement devices described herein, such as the measurement device 100, may include at least one slot aperture 106 configured to transmit a laser projection ray, receive a reflected laser projection ray, or combinations thereof. As shown via slot aperture 106 of FIG. 1, the slot aperture 106 may be configured to both transmit the laser projection ray and receive the reflected laser projection ray. As described in greater detail below with respect to the measurement devices 140, 160, the at least one slot aperture may include a laser slot aperture 159, 166 configured to transmit a laser projection ray and one or more distance sensor slot apertures 168, 170A, 170B configured to receive the reflected laser projection ray.

Referring again to FIG. 1, the measurement device 100 may include a chipset system 108 to generate a relative distance to a remote product. The chipset systems 108, 180 may include at least one distance sensor, a wireless module, a laser, and a microcontroller. The at least one distance sensor comprises one or more lidar sensors, a laser rangefinder, or combinations thereof as described herein.

Referring to FIG. 1, the first housing 102 includes a portion configured to receive and hold the chipset system 108 including a module 109 that may include a chipset device such as a Bluetooth module, defined in greater detail below, for wireless communication and one or more connectors 110 that may be, for example, JST connectors. The module 109 may be a rangefinder device, such as a laser rangefinder configured to measure distance from a remote product to an observed point of the rangefinder. In an embodiment, a laser projection ray from the module 109 is configured to project from and be reflected back through the slot aperture 106.

Figure 3:
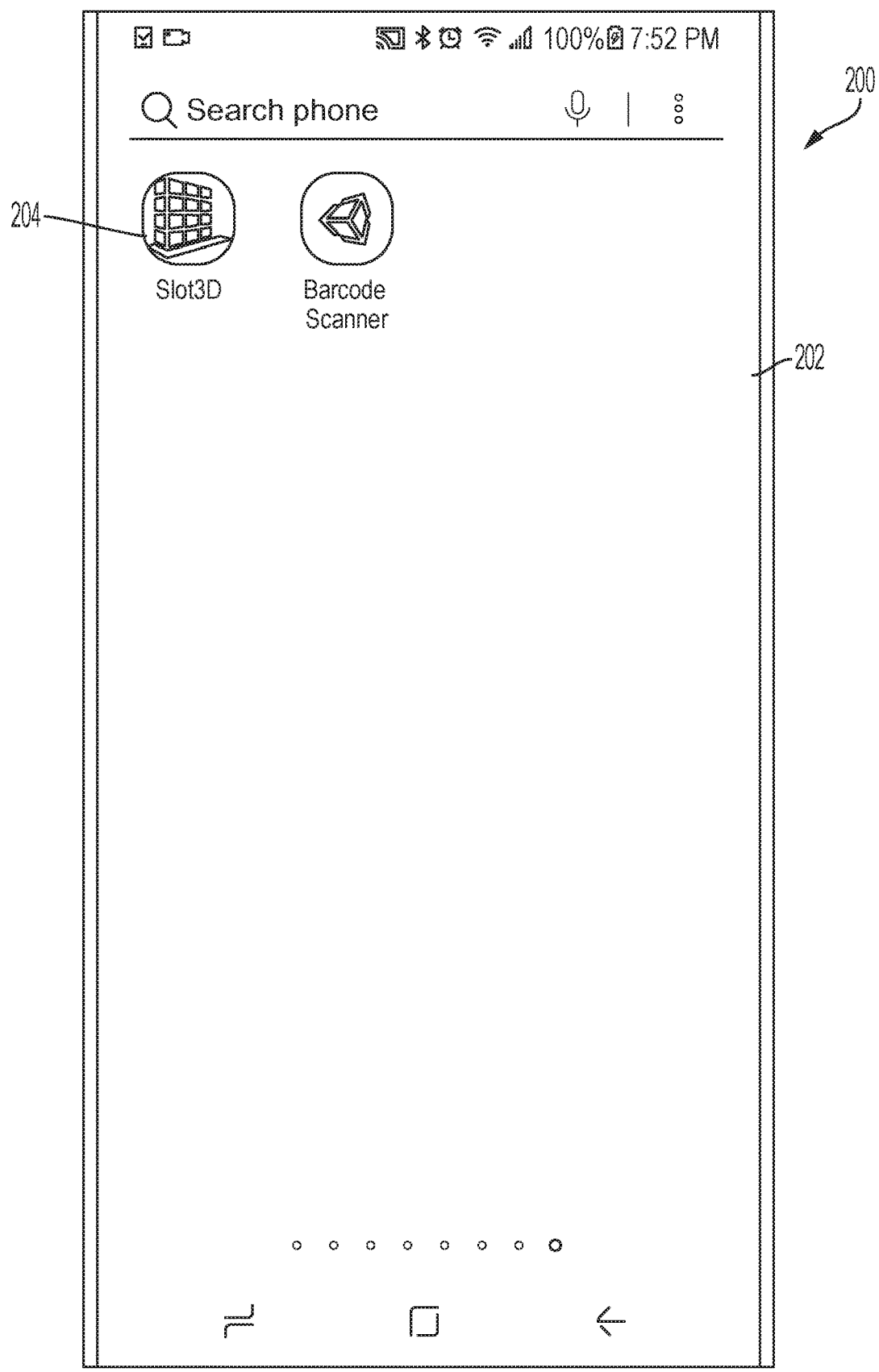
FIG. 3 illustrates a smart mobile device with an application tool for automated product measurement, according to one or more embodiments shown and described herein.
Figure 5:
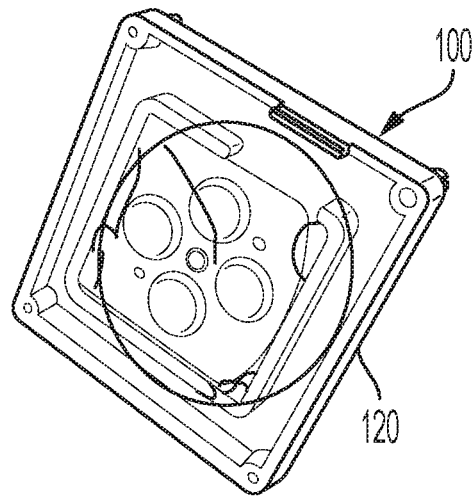
FIG. 5 illustrates an isometric side view of the measurement device of FIG. 1 including an internal attachment magnet, according to one or more embodiments shown and described herein.

FIG. 3 illustrates a smart mobile device 200 with an application tool 204 for automated product measurement accessible via a graphical user interface 202 of the smart mobile device 200. The application tool 204 is configured to operate with the measurement device 100 to generate a distance to a remote object and object dimensions, as described herein. The measurement device 100 may be attached to the smart mobile device 200 to generate the measurements, as described in greater detail further below. In an embodiment, the measurement device 100 is configured to couple to the smart mobile device via an attachment mechanism, such as a magnet, fastener, or suitable attachment mechanism as understood to one of ordinary skill in the art. As a non-limiting example, FIG. 5 illustrates an isometric side view of the measurement device 100 including an internal attachment magnet 120 configured to attached the measurement device 100 to an image capture device, such as the smart mobile device 200 or another computing device 324, as described in greater detail below.

Figure 4A:
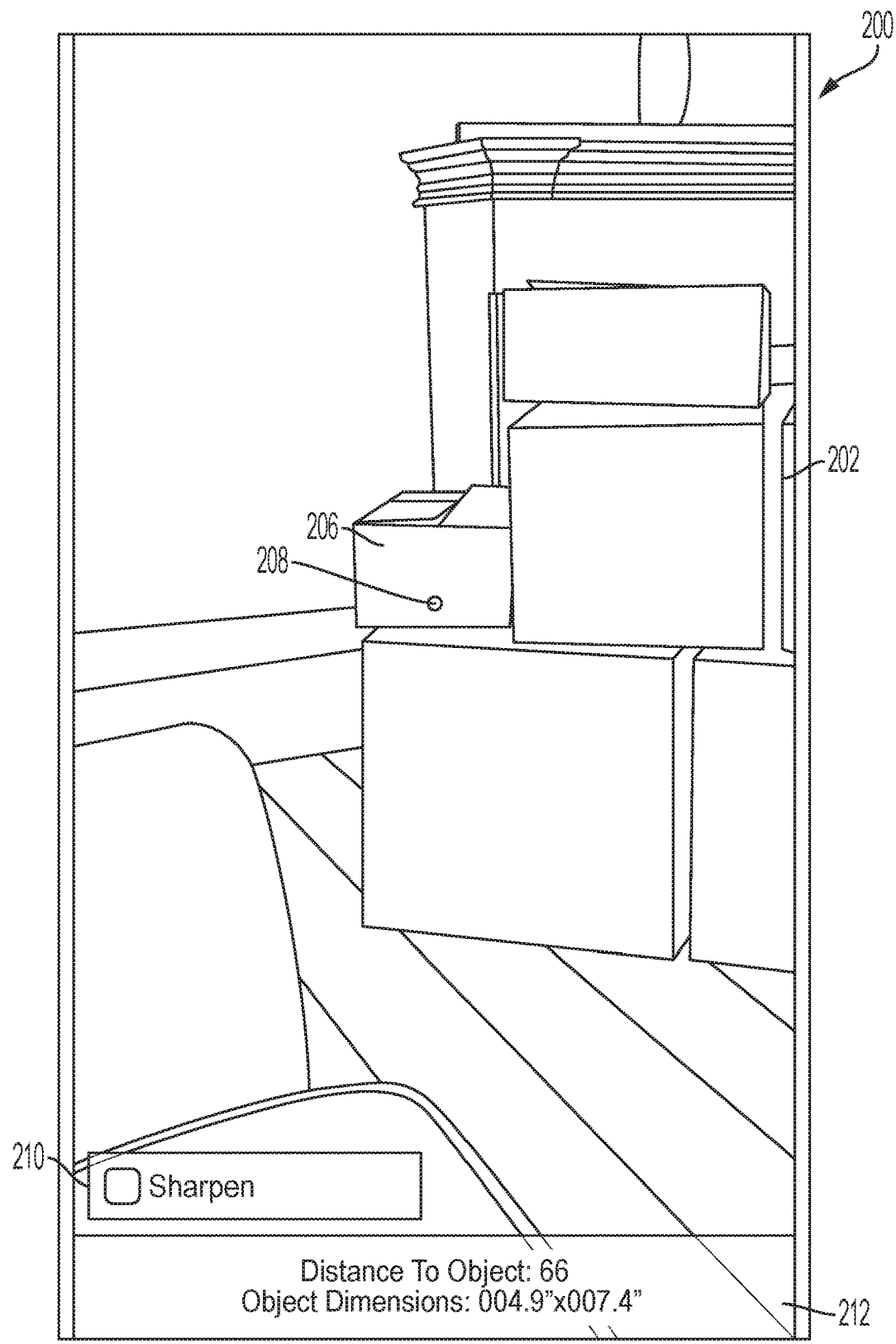
FIG. 4A illustrates a screen view of the application tool for automated product measurement capturing an image of a remote product and returning distance and object dimensions with respect to the remote product, according to one or more embodiments shown and described herein.

FIG. 4A illustrates a screen view on the GUI 202 of the application tool 204 of FIG. 3 for automated product measurement, the GUI 202 of FIG. 4A showing an image capture of a remote product 206 and a returned distance and object dimensions with respect to the remote product in an output screen 212. The remote product 206 is an object in the captured image that may be sharpened for processing through use of the a sharpen tool 210. As a non-limiting embodiment, the output screen 212 returns dimensions for the remote product 206 of a distance to the object of 66 and object dimensions of the remote product 206 of 4.9"×7.4". In embodiments, object dimensions may include length, width, and/or depth dimensions. The application tool 204 is configured to cooperate with the measurement device 100 to generate the returned distance and object dimensions with respect to the remote product. In an embodiment, the measurement process including identifying the product by an image capturing feature of the smart mobile device 200. The product in the captured image may be recognized using an artificial intelligence (AI) and machine learning (ML) trained model. Using this recognition, the recognized object is then sent through a variety of post-processors. Once post processing is complete, a relative size of the product in the captured image in pixels to screen size is determined. The measurement device 100, with a known distance to the camera of the smart mobile device 200 to define a known base, is configured to return relative distance from the measurement device 100 to the product as a measured object. Using the relative distance and the relativistic size of capture object, algorithms performing triangulation and linear regression are performed. By way of example, and not as a limitation, the measurement device 100 and the smart mobile device 200 are configured to form an optical 3D measuring system to perform a triangulation algorithm to generate spatial dimensions and geometry of the captured object in the image (e.g., the remote product). The measurement device 100 may include a light projector and act as a first sensor observing the remote product, and a camera of the smart mobile device 200 configured to capture an image of the remote product may act as a second sensor observing the remote product. Projection centers of such first and second sensors and a point 208 on a surface of the remote product 206 form a spatial triangle, and distance between the first and second sensors is known as a base. Through determination of angles between the first sensor and the second sensor projection rays and the intersection point of such rays, a 3D coordinate and triangulation distance from the first and second sensors to the intersection point on the remote product is determined. After performing these algorithms, an automated actual product measurement of the remote product based on the relative product size and the relative distance is generated. As a non-limiting example, a real-life size of the object for automated measurement is returned, and the data may be stored for use in other applications.

Figure 4B:
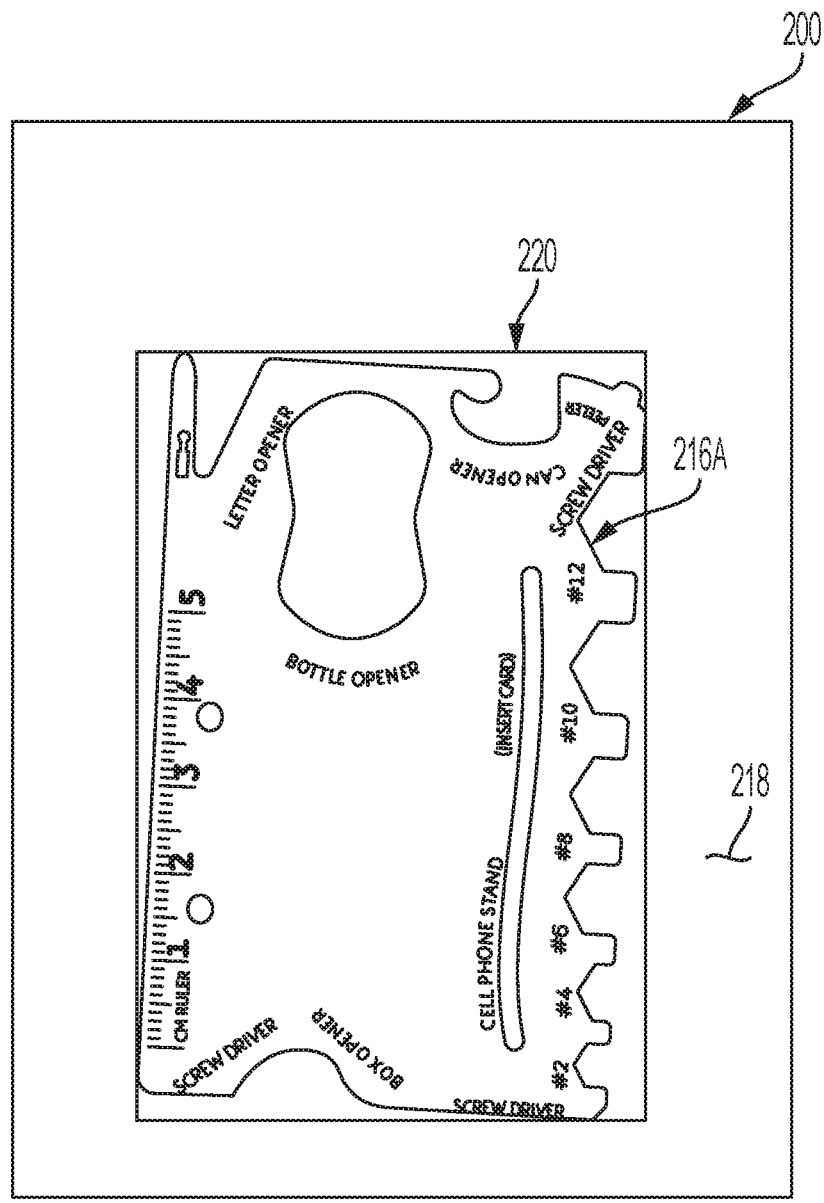
FIG. 4B illustrates a screen view of the application tool for automated product measurement capturing an image of another remote product, according to one or more embodiments shown and described herein.
Figure 4C:
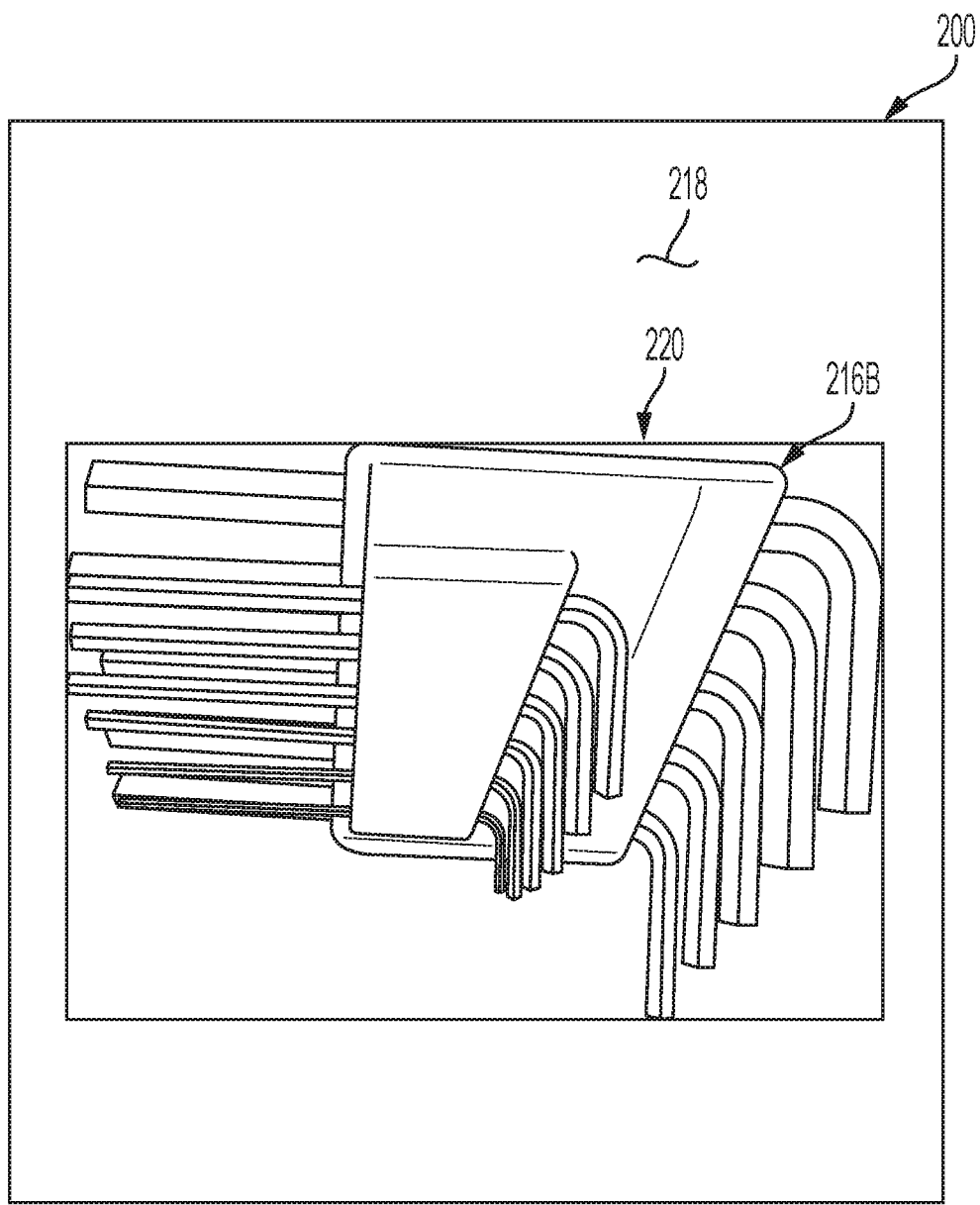
FIG. 4C illustrates a screen view of the application tool for automated product measurement capturing an image of yet another remote product, according to one or more embodiments shown and described herein.

FIG. 4B and FIG. 4C respectively illustrate screen views on the smart mobile device 200 of FIG. 3 that is coupled with the application tool 204 for automated product measurement, showing an image capture of a remote product 216A, 216B against a back surface 218 and a digital boundary box 220 disposed about dimensions of the remote product 216A, 216B to generate associate dimensions, such as length and width, for the remote product 216A, 216B. The digital boundary box 220 may be fit as a minimum sized rectangle about the remote product 216A, 216B. The back surface 218 may be a solid color, flat background placemat on which the remote product 216A, 216B is disposed, such as in the center. A smart mobile device 200 may capture an image of the remote product 216A, 216B, and distance data from an associated measurement device 100 as described herein may be utilized along with image data to calculate a pixel per inch ratio from which to generate depth and width dimensions for the remote product 216A, 216B.

In embodiments, workflow for use of the smart mobile device 200 and the measurement device 100 to generate an automated actual product measurement of the remote product based on the relative product size and the relative distance may include loading of the application tool 204 onto the smart mobile device 200 by a user. The application tool 204 may be configured to work on smart mobile devices 200 or computing devices 324 such as mobile platforms, tablets, laptops, desktops and others, including, but not limited to, such as Xbox, Playstation, and the like. The smart mobile devices 200 or computing devices 324 may include, but not be limited to, operating systems such as Android OS, iOS, Window, Linux, PC, Mac, or the like. The user may attach the measurement hardware 100 configured to measure distance to the smart mobile device 200 (or other computing device 324, as described below) using internal magnets 120 as shown in FIG. 5 or another attachment system. The application tool 204 may be configured to recognize products without the measurement device 100, but the measurement device 100 is configured to triangulate a size of the product to return object dimensions as described herein.

The user may launch the application tool 204 from the smart mobile device 200 to which the measurement device 100 is attached. The application tool 204 may include a wireless communication protocol for connectivity such as Bluetooth, Wi-Fi, Radio or some other type of wireless communication protocol. Once the application tool 204 is launched and a hardware connection has been established, the user can move the device around to detect a remote product and capture an image of the remote product through an image capture feature (e.g., a camera) of the smart mobile device 100. The application tool 204 may generate an automated actual product measurement of the remote product based on the relative product size and the relative distance and take the data from said measurements to store the information locally, while uploading the data to a pre-established database.

Figure 6:
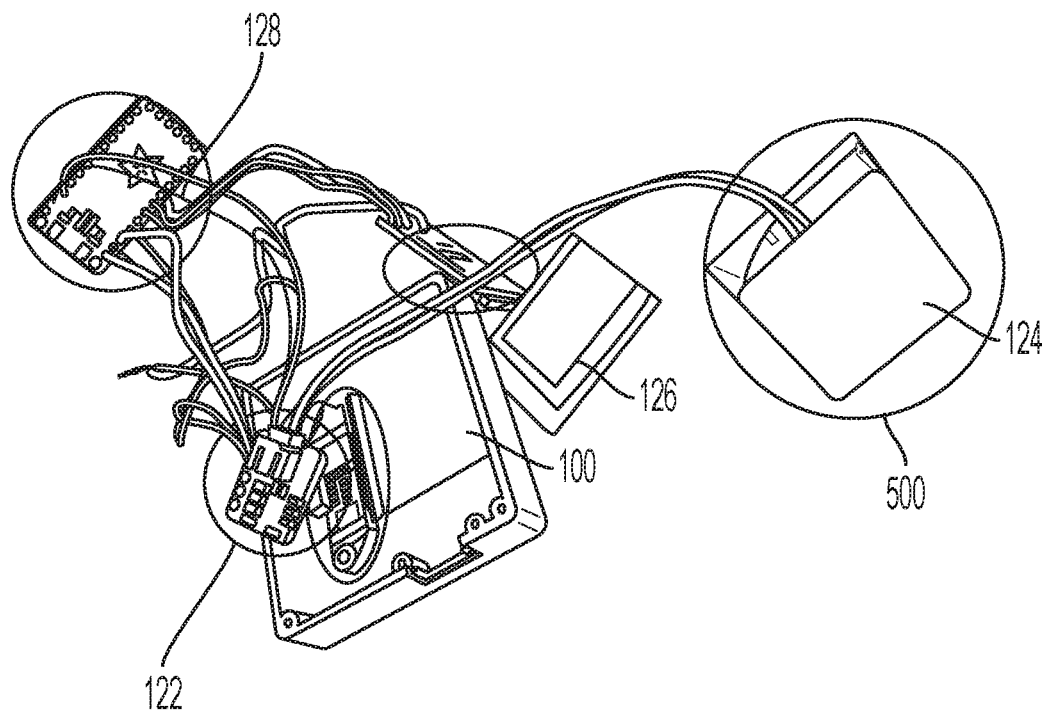
FIG. 6 illustrates hardware components for a system to automate remote product measurement, according to one or more embodiments shown and described herein.

FIG. 6 illustrates an embodiment including hardware components for a system to automate remote product measurement, which hardware components are communicatively coupled through wires as shown. The communicatively coupled hardware components include the measurement device 100, a Bluetooth BLE module 122, a first battery 124, a second battery 126, and a microcontroller 128. The measurement device 100 includes a distance sensor that may have a distance sensor current utilizing a TFMim, which is a time of flight (TOF) LiDAR sensor configured to measure distance to an object based on reflection of a laser with respect to the object. The first and second batteries 124, 126 may be PKCELL LP503035 3.7V 500 mAh Li-Ion Polymer (LiPo) batteries as commercially available through Shenzhen PKCELL Battery Co, Ltd. of Shenzhen, China. FIG. 6 further illustrates a communicatively coupled Bluetooth BLE module and LiPo Voltage modifier 122.

In embodiments, a wire encoder may be used to determine a wire dimension. As a non-limiting example, a digital draw wire encoder may be embedded into hardware associated with the measurement system. A draw wire of the digital draw wire encoder may be drawn along a measurement portion of the remote product 106 to determine a dimension that is digitally communicated to an embedded microcontroller, which then forwards the associated data on to the smart mobile device 200, such as at a baud rate of 9600 to transfer data at 9600 bits per second. Data transmitted from the digital draw wire encoder to the smart mobile device 200 may then be displayed on the GUI 202 of the smart mobile device 200 via the application tool 204. A user of the application tool 204 may select from dimensions such as length, width, and height in the application tool 204. The associated wire dimension may be transferred to a live product dimension layout for display on the GUI 202 via the application tool 204.

Alternatively or additionally, a wireless scale may be used with the measurement system to assist with determining weight of the remote product 206. The wireless scale may be powered by a battery, such as a 1000 mAh+ battery. The wireless scale may utilize Long Range (LoRa) technology, which is a low-power wide-area network technology, or other wireless technology described herein, such as Bluetooth technology, to communicate with the microcontroller 128 of the measurement device 100, which transmits the data to the smart mobile device 200 via serial communication. The application tool 204 may show a live feed of data from the wireless scale on the GUI 202. When a user of the application tool 204 approves the data, the weight from the wireless scale data may be transferred to a queue and metadata manager to record and/or for use with other product dimension determination as described herein.

Figure 7:
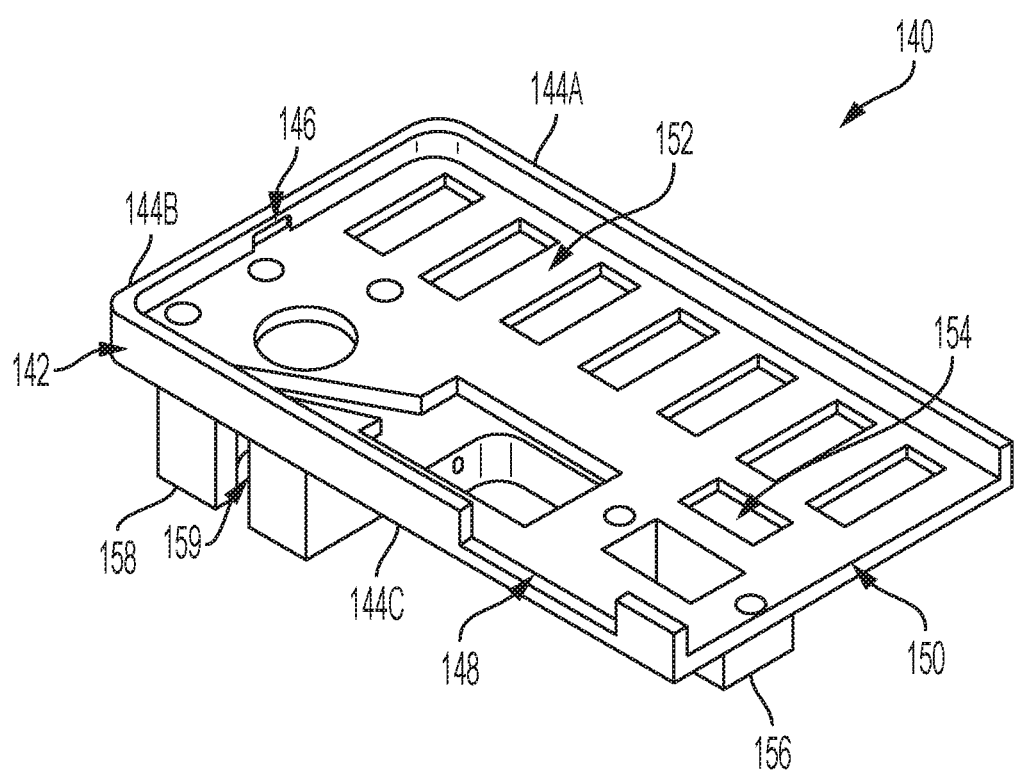
FIG. 7 illustrates another embodiment of a measurement device for remote product measurement, according to one or more embodiments shown and described herein.

Referring to FIG. 7, another embodiment of a measurement device 140 for remote product measurement is shown.

The measurement device 140 includes a sidewall enclosure 140 that defines a receiving surface 152 configured to receive the smart mobile device 200. The sidewall enclosure 140 and the receiving surface 152 are configured to receive the smart mobile device 200. The sidewall enclosure 140 includes sidewalls 144A, 144B, and 144C. Sidewall 144B defines a plug aperture 146 configured to permit passage of a cord and plug associated with the smart mobile device 200. Sidewall 144 defines an access aperture 148 configured to provide access to a button on the side of the smart mobile device 200, such as a volume feature. A slide in opening 150 is defined between ends of sidewalls 144A, 144C and against a receiving surface 152. The slide in opening 150 is configured to receive the smart mobile device 200 for disposition against the receiving surface 152. The receiving surface 152 comprises a plurality of apertures, such as a camera aperture 154 configured to align with a camera 214 of the smart mobile device 200 and apertures configured to provide access to housing protrusions 156, 158. Housing protrusions 156, 158 are configured to house a chipset system, such as chipset system 108 described above, or chipset system 180 described in greater detail below, to generate distance and object related dimensions with respect to a remote product as described herein. The measurement devices 100, 140, 160 described herein include a chipset system 108, 180 configured to generate the relative distance to the remote product 206, 216A, 216B. The chipset system 108, 180 may include, as described herein and in greater detail further below, one or more lidar sensors 188, 190, a laser rangefinder 192, a wireless module 109, 184, a laser 182, and a microcontroller 128, 186. The measurement device 140, 160 may include a slot aperture 159, 166 configured to transmit a laser projection ray from the laser, one or more slot apertures 170A, 170B configured to receive a reflected laser projection ray to send to the one or more lidar sensors 188, 190, and a slot aperture 168 configured to receive the reflected laser projection ray to send to the laser rangefinder 192.

As a non-limiting example, the housing protrusion 158 includes a slot aperture 159 configured to act as a slot for a component as of the chipset system, such as a laser, as described herein. Other apertures are defined in housing protrusions 158, 159. By way of example, and not as a limitation, the housing protrusion 156 may include an underside aperture (such as slot aperture 170A, 170B described in greater detail below with respect to the measurement device 160 of FIGS. 8-11) configured to provide access for a sensor to measure target distance, such as a lidar sensor and/or laser range finder.

Figure 8:
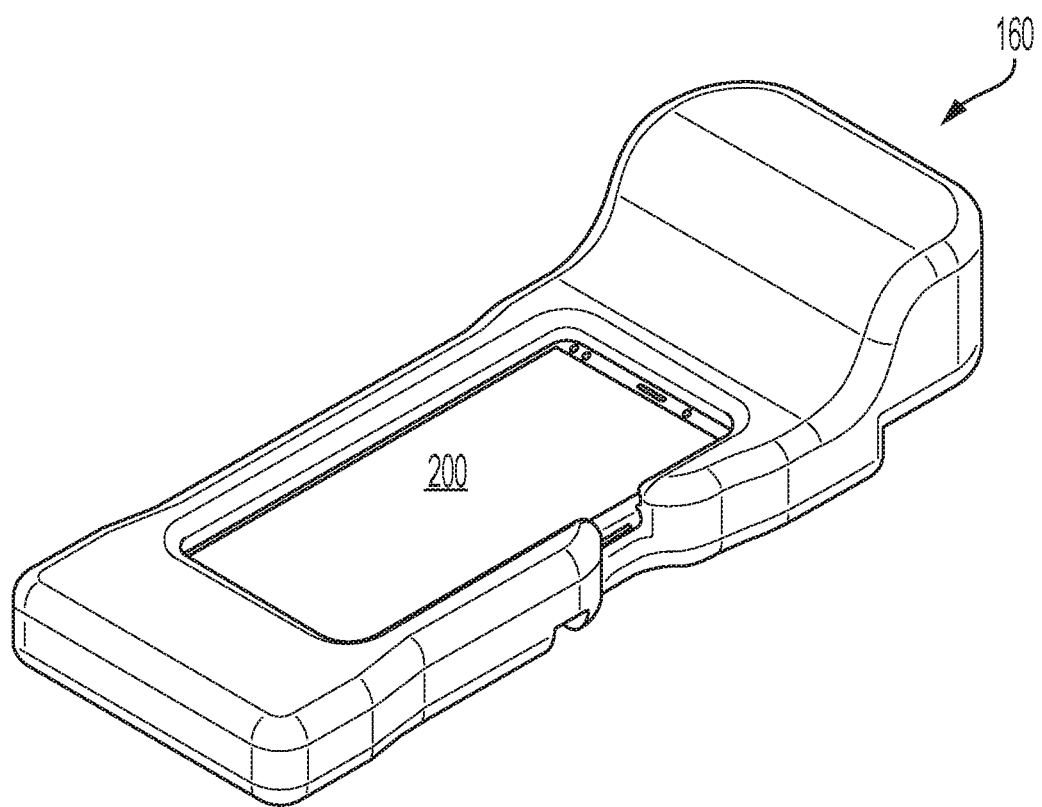
FIG. 8 illustrates yet another embodiment of a measurement device for remote product measurement, according to one or more embodiments shown and described herein.
Figure 9:
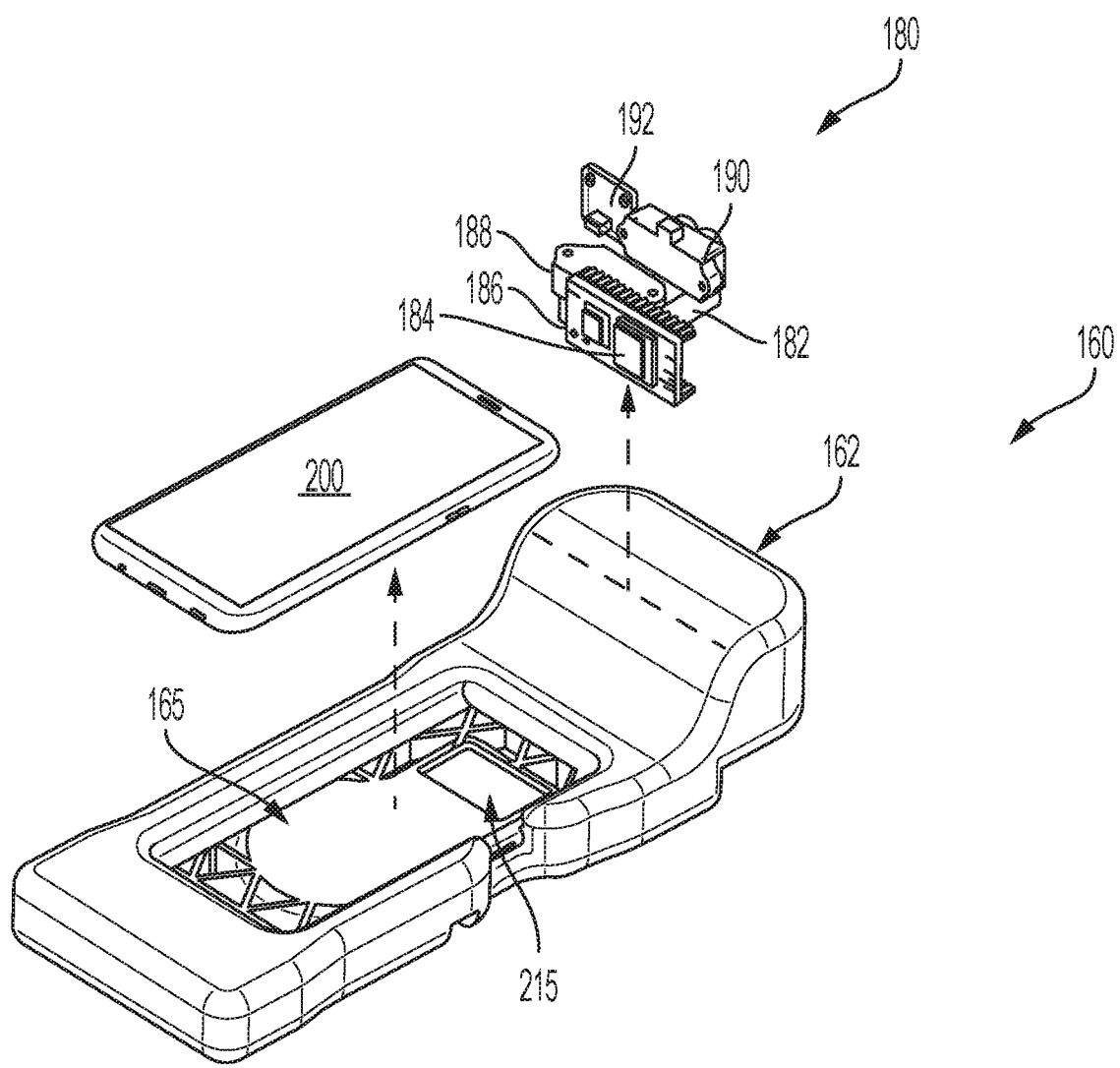
FIG. 9 illustrates an exploded view of the components of the measurement device of FIG. 8.
Figure 10:
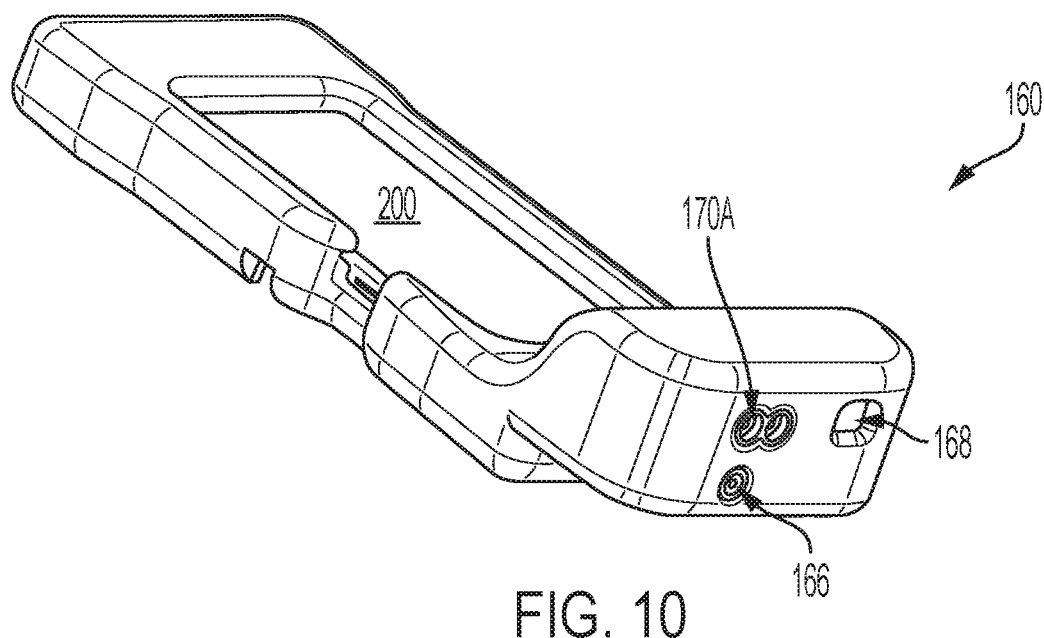
FIG. 10 illustrates a top-front perspective view of the measurement device of FIG. 8.
Figure 11:
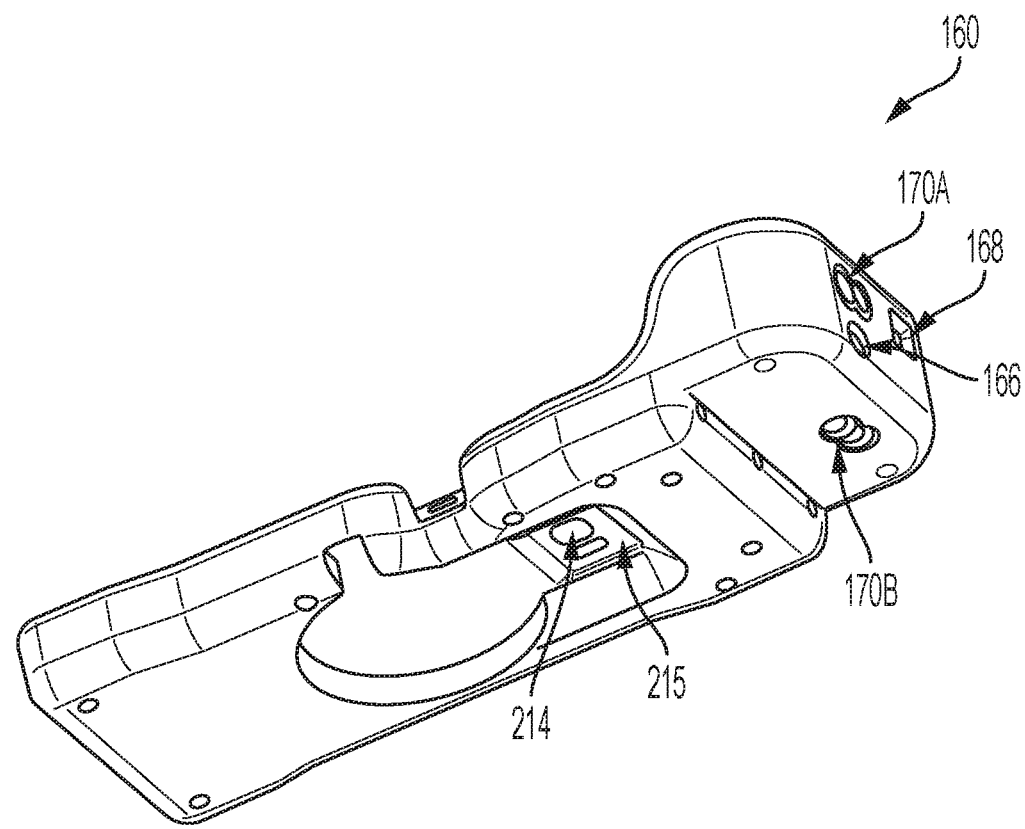
FIG. 11 illustrates a bottom-front perspective view of the measurement device of FIG. 8.

Referring to FIGS. 8-11, views of another measurement device 160 are shown. FIG. 8 shows a top-rear perspective view of the measurement device 160 in which the smart mobile device 200 is housed. FIG. 9 depicts an exploded view of the measurement device 160 of FIG. 8. A smart device receiving aperture 165 is defined by a housing 162 of the measurement device 160. The smart device receiving aperture 165 is sized and shaped to receive the smart mobile device 200. The smart device receiving aperture 165 is further defined by a receiving surface configured to abut against the underside of the smart mobile device 200 and which defines a camera aperture 215 configured to align with the camera 214 (FIG. 11) of the smart mobile device 200. Thus, the measurement device 160 includes the camera aperture 215 configured to align with the camera 214 of the smart mobile device 200.

The housing 162 further includes an internal area, as indicated by the horizontal dashed line, configured to receive a chipset system such as a chipset system 180. The chipset system 180 of FIG. 9 includes a laser 182, a module 184, a microcontroller 186, a first lidar sensor 188, a second lidar sensor 190, and a laser rangefinder 192. The module 184 may be a Bluetooth module, such as an ESP-WROOM-32 module as commercially available by Espressif Systems of Shanghai, China. The module 184 may be disposed on a printed circuit board (PCB) on which the microcontroller 186 is disposed, such as the ESP32S PCB commercially available by Espressif Systems of Shanghai, China. The microcontroller 186 may include a port such as a USB port.

The first lidar sensor 188 and the second lidar sensor 190 are respectively configured to align with apertures 170B (FIG. 11) and 170A (FIG. 10) of the measurement device 160. Each lidar sensor 188 may interact with the laser 182 to measure distance to the remote products 206, 216A, 216B via illuminating the remote product 206, 216A, 216B with laser light from the laser 182 and measuring reflected light via the respective lidar sensor 188, 190. The laser 182 is configured to align with the laser aperture 166 (FIGS. 10-11) to allow passage of the laser light from the laser aperture 166.

The laser rangefinder 192 is configured to align with rangefinder aperture 168 to receive a reflected signal from a laser. For example, the laser rangefinder 192 is configured to use the laser light from the laser 182 as a laser beam to determine a distance to the remote product 206, 216A, 216B via a time of flight principle by measuring time taken by a pulse of the laser beam to be reflected and returned as the reflected signal to the laser rangefinder 182. The laser rangefinder 192 may be a VL53LOX time-of-flight (ToF) laser rangefinder of a Gravity series as commercially available by STMicroelectronics of Geneva, Switzerland.

Figure 12:
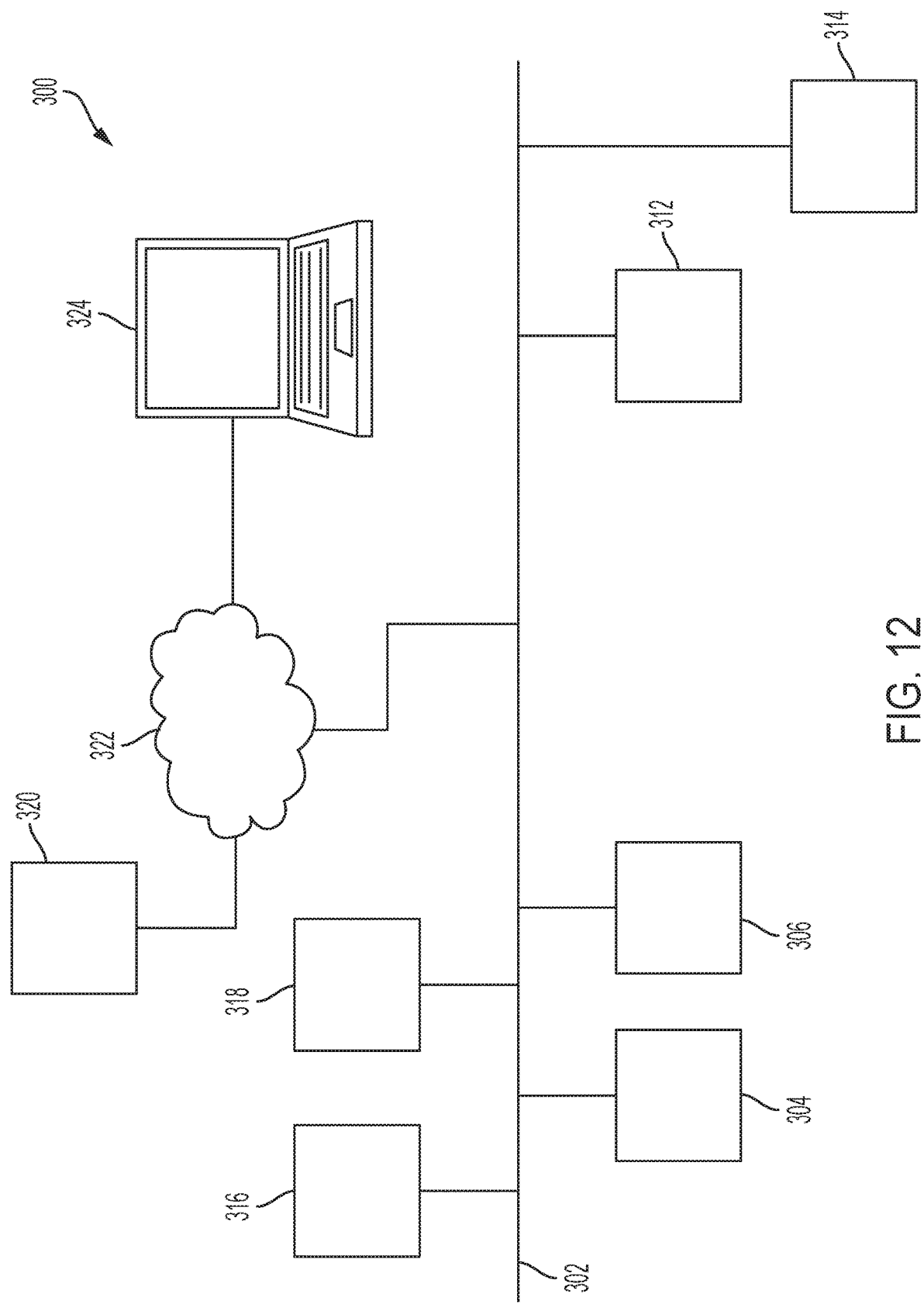
FIG. 12 schematically illustrates the system including the hardware components of FIG. 6 for implementing computer and software based methods to automate remote product measurement, according to one or more embodiments shown and described herein.

Referring to FIG. 12, a system 300 for implementing a computer and software-based method to utilize the system devices, such as the hardware components of FIG. 6, is illustrated. The system 300 may be implemented along with using a graphical user interface (GUI) 202 that is accessible at a user workstation (e.g., a computer 324), for example. The user workstation may be a smart mobile device 200, which may be a smartphone, a tablet, or a like portable handheld smart device. As a non-limiting example, the smart mobile device 200 may be a smartphone such as the iPHONE or a tablet such as the iPAD, both of which are commercially available from Apple, Inc. of Cupertino, Calif. The smart mobile device 200 includes a camera, a processor, a memory communicatively coupled to the processor, and machine readable instructions stored in the memory. The machine readable instructions may cause the system 300 to, when executed by the processor, launch and operate a software application tool 204 on the smart mobile device 200. The machine readable instructions may cause the system 300 to, when executed by the processor, use the functionality provided by the software application tool 204 to follow one or more control schemes as set forth in the one or more processes described herein.

The system 300 includes machine readable instructions stored in the memory that cause the system 300 to perform one or more of instructions when executed by the one or more processors, as described in greater detail below. The system 300 includes a communication path 302, one or more processors 304, a memory component 306, a measurement tool component 312, a storage or database 314 that may include a product image database, an artificial intelligence component 316, a network interface hardware 318, a server 320, a network 322, and at least one computer 324. The various components of the system 300 and the interaction thereof will be described in detail below.

In some embodiments, the system 300 is implemented using a wide area network (WAN) or network 322, such as an intranet or the Internet, or other wired or wireless communication network that may include a cloud computing-based network configuration. The workstation computer 324 may include digital systems and other devices permitting connection to and navigation of the network, such as the smart mobile device 200. Other system 300 variations allowing for communication between various geographically diverse components are possible. The lines depicted in FIG. 12 indicate communication rather than physical connections between the various components.

As noted above, the system 300 includes the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 300 includes the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data. The processor 304 may process the input signals received from the system modules and/or extract information from such signals.

As noted above, the system 300 includes the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the system 300 may include the processor 304 communicatively coupled to the memory component 306 that stores instructions that, when executed by the processor 304, cause the processor to perform one or more functions as described herein.

Still referring to FIG. 12, as noted above, the system 300 comprises the display such as a GUI on a screen of the computer 324 for providing visual output such as, for example, information, graphical reports, messages, or a combination thereof. The computer 324 may include one or more computing devices across platforms, or may be communicatively coupled to devices across platforms, such as smart mobile devices 200 including smartphones, tablets, laptops, and/or the like. The display on the screen of the computer 324 is coupled to the communication path 302 and communicatively coupled to the processor 304. Accordingly, the communication path 302 communicatively couples the display to other modules of the system 300. The display can include any medium capable of transmitting an optical output such as, for example, a cathode ray tube, light emitting diodes, a liquid crystal display, a plasma display, or the like. Additionally, it is noted that the display or the computer 324 can include at least one of the processor 304 and the memory component 306. While the system 300 is illustrated as a single, integrated system in FIG. 12, in other embodiments, the systems can be independent systems.

The system 200 comprises the measurement tool component 312 to automate measurement of a remote identified product that is identified through use of a camera of the smart mobile device 200 and the artificial intelligence component 316 to train and provide machine learning capabilities to a neural network associated with the identification algorithm that identifies the product from the captured image as described herein. The measurement tool component 312 and the artificial intelligence component 316 are coupled to the communication path 302 and communicatively coupled to the processor 304. The processor 304 may process the input signals received from the system modules and/or extract information from such signals.

Data stored and manipulated in the system 300 as described herein is utilized by the artificial intelligence component 316, which is able to leverage a cloud computing-based network configuration such as the cloud to apply Machine Learning and Artificial Intelligence. This machine learning application may create models that can be applied by the system 300, to make it more efficient and intelligent in execution. As an example and not a limitation, the artificial intelligence component 316 may include components selected from the group consisting of an artificial intelligence engine, Bayesian inference engine, and a decision-making engine, and may have an adaptive learning engine further comprising a deep neural network learning engine.

The system 300 includes the network interface hardware 318 for communicatively coupling the system 300 with a computer network such as network 322. The network interface hardware 318 is coupled to the communication path 302 such that the communication path 302 communicatively couples the network interface hardware 218 to other modules of the system 300. The network interface hardware 318 can be any device capable of transmitting and/or receiving data via a wireless network. Accordingly, the network interface hardware 318 can include a communication transceiver for sending and/or receiving data according to any wireless communication standard. For example, the network interface hardware 318 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 12, data from various applications running on computer 324 can be provided from the computer 324 to the system 300 via the network interface hardware 318. The computer 324 can be any device having hardware (e.g., chipsets, processors, memory, etc.) for communicatively coupling with the network interface hardware 318 and a network 322. Specifically, the computer 324 can include an input device having an antenna for communicating over one or more of the wireless computer networks described above.

The network 322 can include any wired and/or wireless network such as, for example, wide area networks, metropolitan area networks, the Internet, an Intranet, the cloud 323, satellite networks, or the like. Accordingly, the network 322 can be utilized as a wireless access point by the computer 324 to access one or more servers (e.g., a server 320). The server 320 and any additional servers such as a cloud server generally include processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

Figure 13:
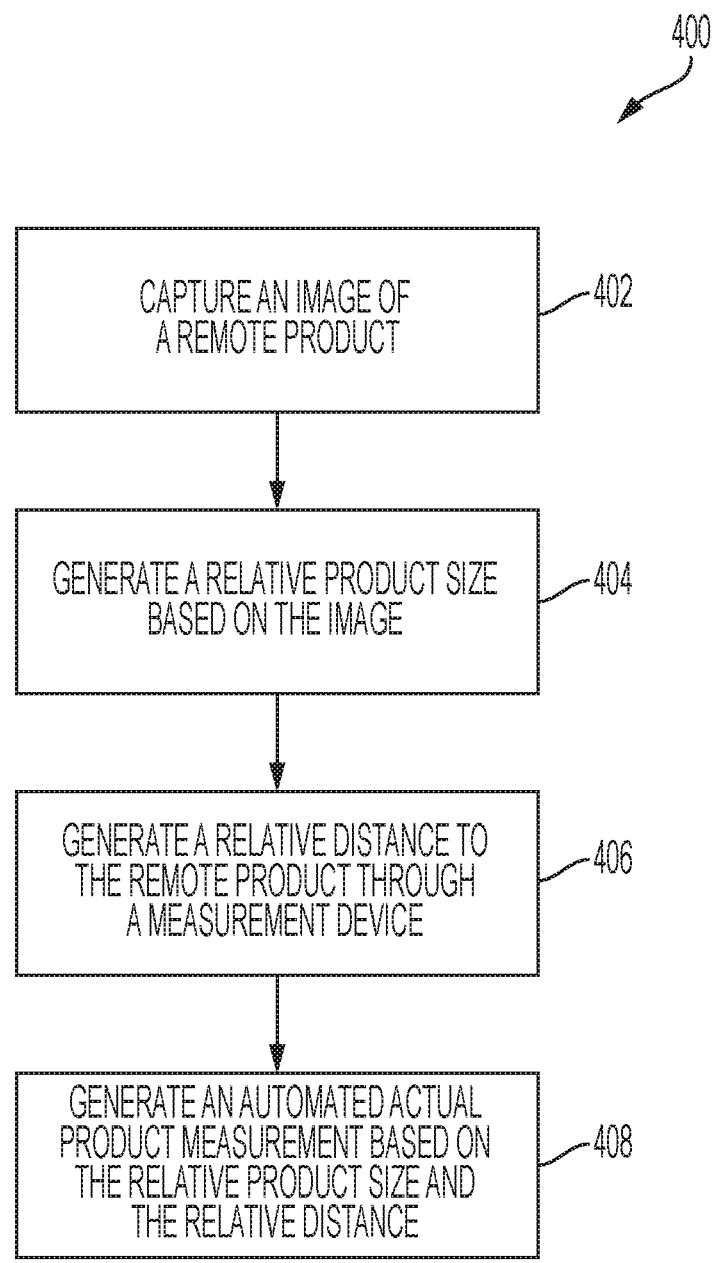
FIG. 13 is a flow chart of a process for automated product measurement that may be implemented by the system of FIG. 12.

Referring to FIG. 13, a process 400 is shown for implementation via the system 300 as described herein. In block 402, an image of a remote product 206, 216A, 216B is captured. In an embodiment, the camera 214 of the smart mobile device 200 is used to capture an image of a remote product 206, 216A, 216B. In block 404, a relative product size for the remote product 206, 216A, 216B is generated based on the image. A sizing algorithm may be applied to the image of the remote product 206, 216A, 216B as described herein via the application tool 204 to generate the relative product size.

In block 406, a relative distance to the remote product 206, 216A, 216B is generated through the measurement device 100, 140, 160 as described herein. In block 408, an automated actual product measurement is generated based on the relative product size and the relative distance. By way of example, and not as a limitation, triangulation and linear regression algorithms are applied via the application tool 204 to generate one or more automated actual product measurements of the remote product 206, 216A, 216B based on the relative product size and the relative distance.

In embodiments, the application tool 204 of the smart mobile device 200 for automated product measurement may implements blocks of the process 400. The application tool 204 may include a processor, a memory communicatively coupled to the processor, machine readable instructions stored in the memory to cause the application to perform at least the following when executed by the processor: receive an image of a remote product, apply a sizing algorithm to the image of the remote product to generate a relative product size, receive a relative distance to the remote product from a measurement device communicatively coupled to the application tool, and apply triangulation and linear regression algorithms to generate an automated actual product measurement of the remote product based on the relative product size and the relative distance.

The image may be captured by a camera 214 of the smart mobile device 200. In embodiments, the image may captured with the remote product 216A, 216B disposed against a background surface 218 as shown and described above with respect to FIGS. 4A-4B. The machine readable instructions may further cause the application tool 204 to perform at least the following when executed by the processor: generate a digital boundary box 220 in the image as a minimum sized rectangle about the remote product 216A, 216B disposed on the background surface 218 in the image, calculate a pixel per inch ratio based on the digital boundary box 220, and generate the automated actual product measurement of the remote product 216A, 216B based on the pixel per inch ratio. The automated actual product measurement may include a length dimension, a width dimension, a depth dimensions, or combinations thereof for the remote product 216A, 216B.

The systems and methods described herein streamline a process to automate measurement of remote products. Removing user-based manual measurement steps reduces a potential of human error while increasing accuracy through the systems described herein. The systems and methods described herein further increase speed of generation of object dimensions of remote products compared to manual measurement methods, and further improve efficiency of data storage through automated upload to a cloud in comparison to manual data entry upload.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for automated product measurement, the system comprising:
   a measurement device;
   a smart mobile device including a camera and an application tool;
   a processor;
   a memory communicatively coupled to the processor; and
   machine readable instructions stored in the memory to cause the system to perform at least the following when executed by the processor:
      use the camera of the smart mobile device to capture an image of a remote product;
      apply a sizing algorithm to the image of the remote product via the application tool to generate a relative product size;
      generate a relative distance to the remote product through the measurement device;
      apply triangulation and linear regression algorithms via the application tool to generate an automated actual product measurement of the remote product based on the relative product size and the relative distances;
      generate a digital boundary box in the image as a minimum sized rectangle about the remote product disposed on the background surface in the image;
      calculate a pixel per inch ratio based on the digital boundary box; and
      generate the automated actual product measurement of the remote product based on the pixel per inch ratio.

2. The system of claim 1, wherein the measurement device comprises a chipset system configured to generate the relative distance.

3. The system of claim 2, wherein the chipset system comprises at least one distance sensor, a wireless module, a laser, and a microcontroller.

4. The system of claim 3, wherein the at least one distance sensor comprises one or more lidar sensors, a laser rangefinder, or combinations thereof.

5. The system of claim 1, wherein the measurement device comprises a camera aperture configured to align with the camera of the smart mobile device.

6. The system of claim 1, wherein the measurement device comprises at least one slot aperture configured to transmit a laser projection ray, receive a reflected laser projection ray, or combinations thereof.

7. The system of claim 6, wherein the at least one slot aperture comprises a slot aperture configured to both transmit the laser projection ray and receive the reflected laser projection ray.

8. The system of claim 6, wherein the at least one slot aperture comprises a laser slot aperture configured to transmit the laser projection ray and one or more distance sensor slot apertures configured to receive the reflected laser projection ray.

9. The system of claim 1, wherein the measurement device comprises a sidewall enclosure and a receiving surface, the receiving surface and the sidewall enclosure configured to receive the smart mobile device.

10. The system of claim 1, wherein the measurement device is configured to couple to the smart mobile device via an attachment mechanism.

11. The system of claim 10, wherein the attachment mechanism is a magnet.

12. The system of claim 1, wherein the smart mobile device comprises a smartphone or a smart tablet.

13. A method for automated product measurement, the method comprising:
   using a camera of a smart mobile device to capture an image of a remote product, the smart mobile device including an application tool;
   applying a sizing algorithm to the image of the remote product via the application tool to generate a relative product size;
   generating a relative distance to the remote product through a measurement device; and
   applying triangulation and linear regression algorithms via the application tool to generate an automated actual product measurement of the remote product based on the relative product size and the relative distances;
   generating a digital boundary box in the image as a minimum sized rectangle about the remote product disposed on the background surface in the image;
   calculating a pixel per inch ratio based on the digital boundary box; and
   generating the automated actual product measurement of the remote product based on the pixel per inch ratio.

14. The method of claim 13, wherein the measurement device comprises a chipset system configured to generate the relative distance, the chipset system comprising one or more lidar sensors, a laser rangefinder, a wireless module, a laser, and a microcontroller.

15. The method of claim 14, wherein the measurement device comprises a slot aperture configured to transmit a laser projection ray from the laser, one or more slot apertures configured to receive a reflected laser projection ray to send to the one or more lidar sensors, and a slot aperture configured to receive the reflected laser projection ray to send to the laser rangefinder.

16. The method of claim 13, wherein the measurement device comprises at least one slot aperture configured to transmit a laser projection ray from a laser, receive a reflected laser projection ray to send to one or more distance sensors, or combinations thereof.

17. An application tool of a smart mobile device for automated product measurement, the application tool comprising:
   a processor;
   a memory communicatively coupled to the processor; and machine readable instructions stored in the memory to cause the application tool to perform at least the following when executed by the processor:

receive an image of a remote product;

apply a sizing algorithm to the image of the remote product to generate a relative product size;

receive a relative distance to the remote product from a measurement device communicatively coupled to the application tool; and apply triangulation and linear regression algorithms to generate an automated actual product measurement of the remote product based on the relative product size and the relative distances;

generate a digital boundary box in the image as a minimum sized rectangle about the remote product disposed on the background surface in the image;

calculate a pixel per inch ratio based on the digital boundary box; and generate the automated actual product measurement of the remote product based on the pixel per inch ratio.

18. The application tool of claim 17, wherein the automated actual product measurement comprises a length dimension, a width dimension, a depth dimensions, or combinations thereof for the remote product.

19. The application tool of claim 17, wherein the image is captured by a camera of the smart mobile device, and the machine readable instructions further cause the application tool to perform at least the following when executed by the processor: receive weight information of the remote product from a wireless scale communicatively coupled to the application tool.

* * * * *

UNITED STATES PATENT AND TRADEMARK OFFICE
CERTIFICATE OF CORRECTION

PATENT NO. : 11,216,966 B2
APPLICATION NO. : 16/824768
DATED : January 4, 2022
INVENTOR(S) : Jeremy Johnson It is certified that error appears in the above-identified patent and that said Letters Patent is hereby corrected as shown below:

In the Specification

In Column 6, Line(s) 23, delete "TFMim" and insert --TFMini--, therefor.

Signed and Sealed this
Seventeenth Day of May, 2022

Katherine Kelly Vidal
*Director of the United States Patent and Trademark Office*